United States Patent [19]
Lewis

[11] 3,958,415
[45] May 25, 1976

[54] FUEL CONTROL SYSTEM FOR GAS TURBINE ENGINE

[75] Inventor: Geoffrey Arthur Lewis, Solihull, England

[73] Assignee: Lucas Aerospace Limited, Birmingham, England

[22] Filed: Aug. 21, 1974

[21] Appl. No.: 499,112

[30] Foreign Application Priority Data
Sept. 6, 1973 United Kingdom............... 41883/73

[52] U.S. Cl....................... 60/39.28 R; 60/39.16 R; 60/39.28 P
[51] Int. Cl.² .......................................... F02C 9/10
[58] Field of Search................. 60/39.28 R, 39.28 P, 60/39.16 R, 243

[56] References Cited
UNITED STATES PATENTS

| | | | |
|---|---|---|---|
| 3,173,468 | 3/1965 | McCombs | 60/39.28 R |
| 3,514,948 | 6/1970 | Warne | 60/39.28 R |
| 3,780,527 | 12/1973 | Lewis | 60/39.28 R |
| 3,808,801 | 5/1974 | Taylor | 60/39.28 R |

Primary Examiner—Clarence R. Gordon

[57] ABSTRACT

A fuel control system for a gas turbine engine has a pump which delivers fuel to a supply passage. A spill valve downstream of the pump is responsive to a servo pressure signal to spill fuel from the supply passage. A pilot valve is controlled by a torque motor to regulate the servo pressure signal. The torque motor is responsive to an electrical signal dependent on a difference between desired and actual engine speeds.

7 Claims, 2 Drawing Figures

FUEL CONTROL SYSTEM FOR GAS TURBINE ENGINE

This invention relates to fuel control systems for gas turbine engines which include a gas generator turbine and a separate work turbine.

According to the invention a fuel control system for a gas turbine engine, which includes a gas generator turbine and a separate work turbine, comprises a positive-displacement pump driven, in use, by the engine, a spill valve responsive to a servo pressure signal to spill fuel from the downstream side of said pump, a pilot valve responsive to a first electrical signal to control said servo pressure signal, and means for generating said first electrical signal in response to engine operating parameters.

An example of the invention will now be described with reference to the accompanying drawings, in which.

Figure 1:
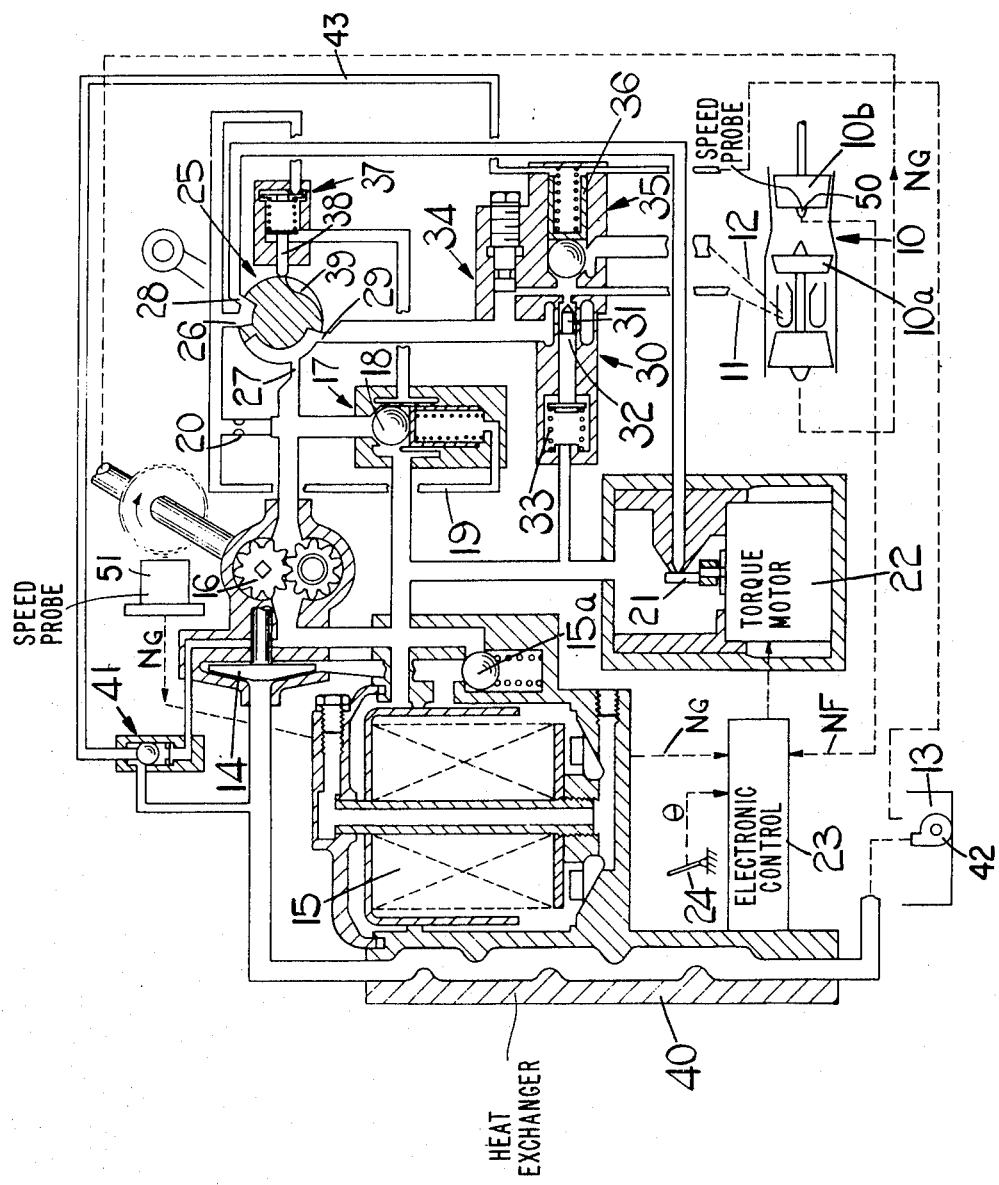
FIG. 1 is a diagram of the mechanical part of a fuel control system.

As shown in FIG. 1 a gas turbine engine 10 includes a gas generator turbine 10a and a separate, free work turbine 10b. The gas generator portion of the engine 10 has two burner manifolds 11, 12, the manifold 11 having fewer burners and being the only manifold to be supplied with fuel during engine starting.

Fuel is supplied from a tank 13 via a centrifugal pump 14 and a filter unit 15 to a positive-displacement gear pump 16. Associated with the filter 15 is a relief valve 15a which operates to by-pass the filter 15 should the latter become clogged. Pumps 14, 16 are both driven by the shaft of the gas generator turbine 10a. Connected across the pump 16 is a spill valve 17 having a ball closure 18 which can be urged shut, against delivery pressure of pump 16, by a servo pressure signal in a line 19.

The signal pressure in line 19 is derived from the delivery pressure of pump 16 via a fluid potentiometer comprising a fixed restrictor 20 and a variable restrictor. The variable restrictor is provided by a plate-type pilot valve 21 controlled by a torque motor 22. Torque motor 22 is responsive to an electrical control signal from an electronic control arrangement 23, so that valve 21 adopts an equilibrium position in which a closing torque provided by the electrical control signal is balanced by the torque due to the pressure in line 19. The pressure in line 19, and hence the pressure of the fuel downstream of pump 16, is thus proportional to the magnitude of the electrical signal to torque motor 22. Control arrangement 23 provides the signal to torque motor 22 in response to the speeds $N_G$ and $N_F$ of the gas generator turbine 10a and the free turbine 10b respectively, and also in response to the position 0 of a control lever 24 by means of which a desired speed of the gas turbine portion of the engine can be selected.

A manually-operable shut-off cock 25 has two inlets 26, 27 and two outlets 28, 29. In the normal running position (as shown in FIG. 1) of cock 25, line 19 communicates with valve 21 via inlet 26 and outlet 28. Furthermore in all positions of cock 25 except a shut down position, the down-stream side of pump 16 can communicate with the burner manifolds 11, 12 via inlet 27, outlet 29 and a pressurising valve 30.

Valve 30 has a stem control element 31 provided with a shoulder 32 and a conical end. The conical end engages the valve orifice and the shoulder 32 is acted upon by the pressure downstream of pump 16 to urge stem 31 against a spring 33 in a direction to open valve 30. An adjustable flow restrictor 34 is connected in parallel with pressurising valve 30, and provides a flow to the engine even when the pressurising valve 30 is shut. When valve 30 is shut the pressure downstream of restrictor 34 acts on the conical end of stem 31 to urge the latter against spring 33.

Since the flow area of pressurising valve 30 increases with increase in the pressure upstream thereof, the rate of change of flow through valve 30 is greater at higher pressures than at lower pressures. This flow characteristic, when added to the square-law characteristic of the engine fuel burners, has the effect that flow through these burners is proportional to the pressure of the unspilt fuel delivered by the pump 16, and hence proportional to the magnitude of the electrical signal to valve 21.

Burner manifolds 11, 12 are connected in parallel to the common outlet of valve 30 and restrictor 34. Fuel can flow to manifold 12 via a valve 35 which is biased shut by a spring loaded piston 36. The effective area of piston 36 is greater than the inlet orifice of valve 35, so that once valve 35 has opened in response to pressure in this inlet, it is maintained open until the inlet pressure falls substantially below the initial opening pressure. At low fuel pressure during engine starting, therefore, all the flow is directed to manifold 11. Manifold 12 is larger than manifold 11, to cater for the additional burners on manifold 12 once valve 35 has opened.

Servo pressure line 19 communicates with the upstream side of pump 16 via a spring loaded relief valve 37. The spring loading of valve 37 is variable by means of a stem 38 which engages a cam surface 39 on shut-off cock 25. In emergency to obtain manual control of spill valve 17, cock 25 is moved through a restraining gate (not shown) anti-clockwise from the position shown in FIG. 1 so that outlet 28 is shut, isolating valve 21 from line 19. In this condition of cock 25, the pressure in line 19 is dependent on the variation of loading, by cam surface 39, of valve 37.

One wall of electronic control arrangement 23 is in contact with a heat exchanger block 40 through which fuel flows after leaving the tank 13. A spring-loaded valve 41 is provided so that, when the engine 10 is shut down, a cooling flow may be provided by a boost pump 42 within the tank 13. In these circumstances the cooling flow passes via a return line 43 back to the tank 13.

Figure 2:
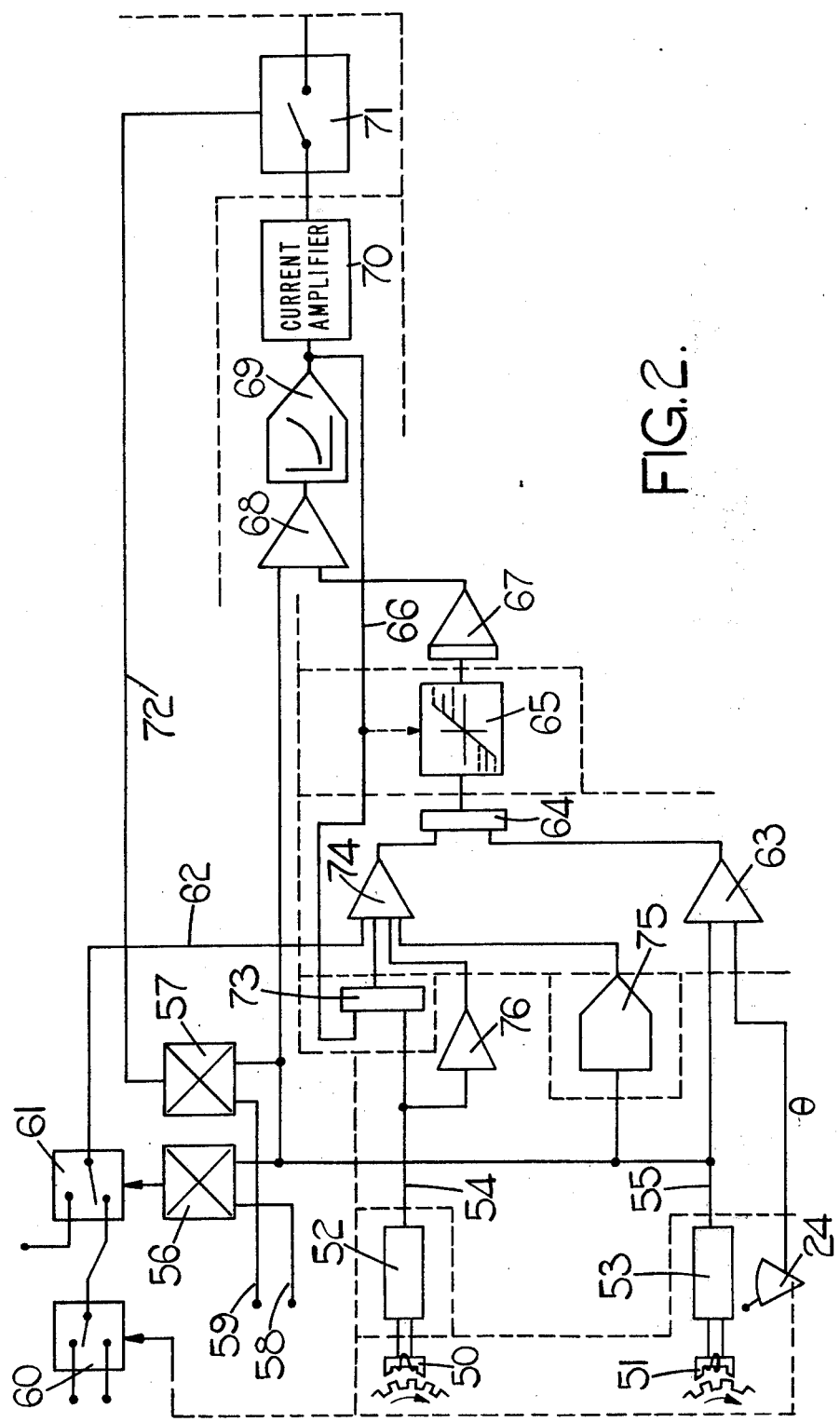
FIG. 2 is a block diagram of the associated electronic control apparatus.

The electronic circuit is shown in FIG. 2 and includes a pair of probes 50, 51, which are respectively responsive to the speeds $N_F$, $N_G$ of the free turbine and the gas generator turbine, to provide alternating output signals. Demodulators 52, 53 receive signals from probes 50, 51 to provide, on lines 54, 55 respectively, D.C. signals proportional to the speeds $N_F$, $N_G$. Comparator circuits 56, 57 each have as one input the signal on line 55. The other input of comparator 56 is a starting speed reference voltage applied via a line 58. The second input of comparator 57 is provided by a signal on a line 59, corresponding to a minimum permissible value of the gas generator turbine speed $N_G$.

A switch 60 is operable, when the control lever 24 has been moved by a predetermined amount from its minimum speed position, to provide an output reference signal which corresponds to a predetermined speed $N_F$ of the free turbine. In an alternative position switch 60 provides an output reference signal corresponding to an idling condition of the engine 10. A relay 61 is responsive to the output of comparator circuit 56 to provide, on a line 62, a signal, which is either the output from switch 60 or a starting reference signal. The output signal from relay 61 thus corresponds either to the starting reference signal or to one of two preset values of fuel flow, the changeover in flow values being responsive to the speed of the gas generator turbine.

An error amplifier 63 is responsive to the signal on line 55 and also to the position 0 of the control lever 24 to provide a signal to a two-input logic circuit 64 which has as an output the lower of its two input signal values. A limiter circuit 65 is responsive to the output of circuit 64 to provide a signal which is a function of a feedback signal on a line 66, this function having upper and lower limiting values dependent on the output of circuit 64.

An integrator circuit 67 is responsive to the output of the limiter circuit 65 to provide one input of a summing amplifier 68 whose other input is provided by the signal on line 55. A non-linear function generator 69 is responsive to the output of summing amplifier 68, and provides the input to a current amplifier 70, and also provides the feedback signal on line 66. The output from amplifier 70 is supplied via a relay 71 to the torque motor 22. Relay 71 is operable in response to the output signal from comparator 57 on a line 72, to energise torque motor 22. This signal on line 72 exists when the gas generator speed signal on line 55 exceeds the minimum speed reference signal on line 59.

The demodulated free turbine speed signal on line 54 is supplied to one input of a logic circuit 73 whose other input is provided by the signal on line 66. Circuit 73 is such that its output is provided by whichever of its two input signals has the higher value. The output of circuit 73 provides a negative signal to one input for an error amplifier 74. A second, positive, input for amplifier 74 is provided by the output of relay 61.

A function generator 75 is responsive to the gas generator speed signal on line 55 to supply a negative signal to a further input of error amplifer 74. The free turbine speed signal on line 54 is supplied via an amplifier 76 to provide a positive signal to a fourth input of amplifier 74.

In use, when the electronic control arrangement is initially switched on, switch 61 provides, on line 62, the starting reference signal referred to above. Since the signal on line 55 is zero, the output from amplifier 63 is high, and logic circuit 64 thus operates to supply the lower value, from amplifier 74, to the limiter circuit 65. The resultant output from integrator 67 provides, on line 66, a feedback signal which passes, via circuit 73 to error amplifier 74, where it is compared with the start reference signal on line 62. The output of function generator 69 thus changes until this output is equal to the start reference voltage on line 62.

When the engine 10 is started, the signal on line 55 increases, and when the gas generator speed $N_G$ exceeds that set by the minimum speed signal on line 59, the resultant signal from comparator 57, on line 72, operates relay 71 to energise the torque motor 22. When the value of the signal on line 55 exceeds the starting speed reference signal on line 58, comparator 56 operates relay 61 to apply the idle speed signal from switch 60 to amplifier 74. Operation of lever 24 to demand an increase in gas generator speed also operates switch 60 so that the signal on line 62 is the free turbine speed reference signal. Increase in the free turbine speed signal on line 54 causes logic circuit 73 to pass this signal to amplifier 74, whose output is then dependent on the free turbine speed error.

I claim:

1. a fuel control system for a gas turbine engine, which includes a gas generator turbine and a separate work turbine, comprising a positive-displacement pump driven, in use, by the engine, a spill valve responsive to a servo pressure signal to spill fuel from the downstream side of said pump, a pilot valve responsive to a first electrical signal to control said servo pressure signal, a flow restrictor in series with said pilot valve between the downstream side of said pump and a low pressure zone, said servo pressure signal being derived from the pressure intermediate said restrictor and said pilot valve, means for generating said first electrical signal in response to engine operating parameters, means for isolating said pilot valve from said restrictor and a further valve in parallel with said pilot valve, said further valve being responsive to operation of said isolating means to control said servo pressure signal.

2. A system as claimed in claim 1 in which said further valve is a relief valve responsive to an increase in said servo pressure signal to connect the zone intermediate said restrictor and said pilot valve to a low pressure, said relief valve including biasing means opposing said servo pressure signal, said biasing means being responsive to said isolating means to vary said servo pressure signal.

3. A system as claimed in claim 1 in which said isolating means comprises a control valve, said control valve also being operable to isolate the downstream side of said pump from said engine.

4. A system as claimed in claim 1 which includes a pressurising valve downstream of said pump, and a spring biasing said pressurising valve against the pressure of fuel flowing from said pump to the engine.

5. A system as claimed in claim 4 which includes a pressure-responsive valve in parallel with said pressurising valve, said pressurising and said pressure-responsive valve being connected, in use, to separate burners on the engine, said pressure-responsive valve having an inlet, a closure member movable in response to the pressure upstream of said inlet, a piston element engageable with said closure member and a spring biasing said piston element in a direction to urge said closure member to shut the pressure-responsive valve, said piston element having a larger cross section than said inlet and being responsive to the pressure downstream of said inlet.

6. A system as claimed in claim 1 which includes switch means responsive to a rise in the speed of said gas generator turbine above a predetermined value for applying said first electrical signal to said pilot valve.

7. A system as claimed in claim 1 which includes means, responsive to the difference between desired and actual values of the speed of said gas generator turbine, for generating a second electrical signal, means responsive to the speed of said work turbine for generating a third electrical signal, means, responsive to whichever of said second and third electrical signals is the lower, for generating a fourth electrical signal, and means, responsive to the difference between said fourth electrical signal and a signal dependent on gas generator turbine speed, for generating said first electrical signal.

* * * * *